United States Patent
Tenneti et al.

(10) Patent No.: US 7,032,034 B1
(45) Date of Patent: Apr. 18, 2006

(54) METHOD AND APPARATUS FOR SIMULATING LARGE SCALABLE NETWORKS

(75) Inventors: Srinivas Tenneti, Fremont, CA (US); Duc Pham, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 696 days.

(21) Appl. No.: 10/061,807

(22) Filed: Jan. 31, 2002

(51) Int. Cl.
*G06F 15/16* (2006.01)

(52) U.S. Cl. .................. 709/249; 709/224; 702/122

(58) Field of Classification Search ............... 709/224, 709/249; 370/241; 714/715; 702/122
See application file for complete search history.

(56) References Cited

U.S. PATENT DOCUMENTS

| | | | | |
|---|---|---|---|---|
| 5,214,646 A | * | 5/1993 | Yacoby | 370/402 |
| 6,041,041 A | * | 3/2000 | Ramanathan et al. | 370/241 |
| 6,601,195 B1 | * | 7/2003 | Chirashnya et al. | 714/43 |
| 6,621,859 B1 | * | 9/2003 | Bell et al. | 375/222 |
| 6,625,764 B1 | * | 9/2003 | Dawson | 714/715 |
| 6,728,214 B1 | * | 4/2004 | Hao et al. | 370/241 |
| 6,845,352 B1 | * | 1/2005 | Wang | 703/24 |
| 6,862,699 B1 | * | 3/2005 | Nakashima et al. | 714/701 |

* cited by examiner

*Primary Examiner*—Rupal Dharia
*Assistant Examiner*—Djenane Bayard
(74) *Attorney, Agent, or Firm*—Sierra Patent Group, Ltd.

(57) ABSTRACT

Methods and apparatus are disclosed for testing the scalability size of a Unit Under Test (UUT) bridging a WAN and a LAN. The method may be repeated until a desired scalability limit has been reached. The apparatus may verify the proper creation of bindings and static routes. The method may be performed by a Dynamic Host Control Protocol (DHCP) server in a system where the UUT comprises a router.

33 Claims, 3 Drawing Sheets

METHOD AND APPARATUS FOR SIMULATING LARGE SCALABLE NETWORKS

BACKGROUND

1. Field of the Invention

The disclosure relates generally to data communications, and in particular, to validating IP addresses assigned to subscribers on large scalable networks.

2. The Prior Art

Dynamic Host Configuration Protocol, abbreviated DHCP, is a protocol that is used to allocate IP addresses and other configuration information automatically for networked systems. DHCP is an update of the Bootstrap Protocol, abbreviated BOOTP, which is an Internet protocol that provides network configuration information to a diskless workstation.

As is appreciated by those of ordinary skill in the art, when a client first boots, it sends out a BOOTP message on the network. This message is received by the server, which obtains the appropriate configuration information and returns that information to the client. This information includes the client's IP address, the IP address of the server, the host name of the server, and the IP address of a default router or relay server.

However, as networks have grown, more and more clients may try to request IP addresses simultaneously, potentially causing an overload and leading to disruptions in service. Thus, it is desired to develop a testing methodology for testing a large scalable DHCP network, simulating a large number of clients requesting IP addresses. In particular, such a test methodology may examine how a Unit Under Test (UUT) processes these requests and functions as a relay agent between the clients and relay server.

SUMMARY

Methods and apparatus are disclosed for testing the scalability size of a Unit Under Test (UUT) bridging a WAN and a LAN. In one aspect, the method may comprise determining the call limit capacity of the UUT; building and generating a predetermined number of Dynamic Host Control Protocol (DHCP) DISCOVER packets; building and generating a corresponding number of DHCP REQUEST packets; verifying the proper creation of corresponding bindings and static routes; if the bindings and static routes have been successfully verified, then repeating the method until a desired scalability limit has been reached; and verifying the proper creation of bindings and static routes.

The method may be performed by a DHCP server in a system where the UUT comprises a router.

BRIEF DESCRIPTION OF THE DRAWING FIGURES

DETAILED DESCRIPTION

Figure 1A:
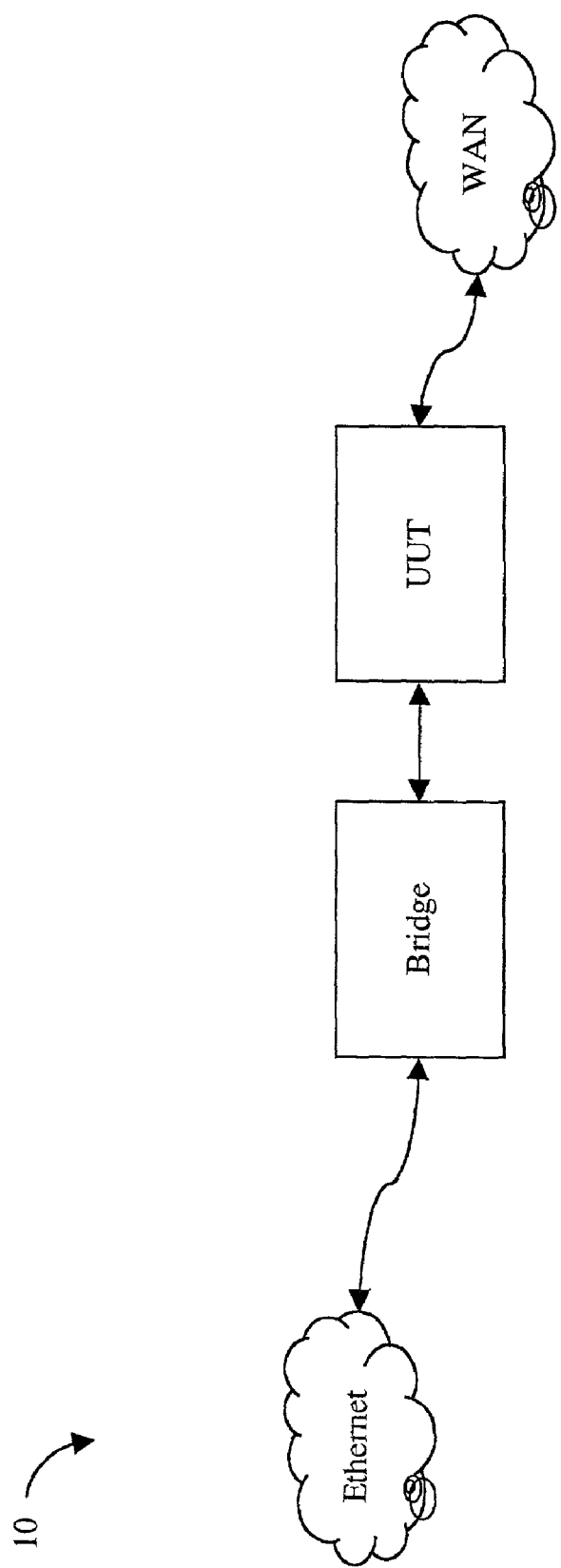
FIG. 1A is a conceptual block diagram of a test system in accordance with the teachings of this disclosure.

Persons of ordinary skill in the art will realize that the following description is illustrative only and not in any way limiting. Other modifications and improvements will readily suggest themselves to such skilled persons having the benefit of this disclosure. In the following description, like reference numerals refer to like elements throughout.

This disclosure may relate to data communications. Various disclosed aspects may be embodied in various computer and machine readable data structures. Furthermore, it is contemplated that data structures embodying the teachings of the disclosure may be transmitted across computer and machine readable media, and through communications systems by use of standard protocols such as those used to enable the Internet and other computer networking standards.

The disclosure may relate to machine readable media on which are stored various aspects of the disclosure. It is contemplated that any media suitable for retrieving instructions is within the scope of the present disclosure. By way of example, such media may take the form of magnetic, optical, or semiconductor media, and may be configured to be accessible by a machine as is known in the art.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein. Accordingly, the representation of various aspects of the present disclosure through the use of flowcharts should not be used to limit the scope of the present disclosure.

FIG. 1A is a block diagram of a system 10, including a Unit Under Test (UUT), also referred to herein as a relay agent, for relaying subscriber requests through a Wide Area Network (WAN) to a DHCP server located on a Local Area Network (LAN) or Ethernet side. The LAN side may be compliant with the IEEE 802.3 series of standards, and may be coupled to the UUT as shown in FIG. 1A.

Figure 1B:
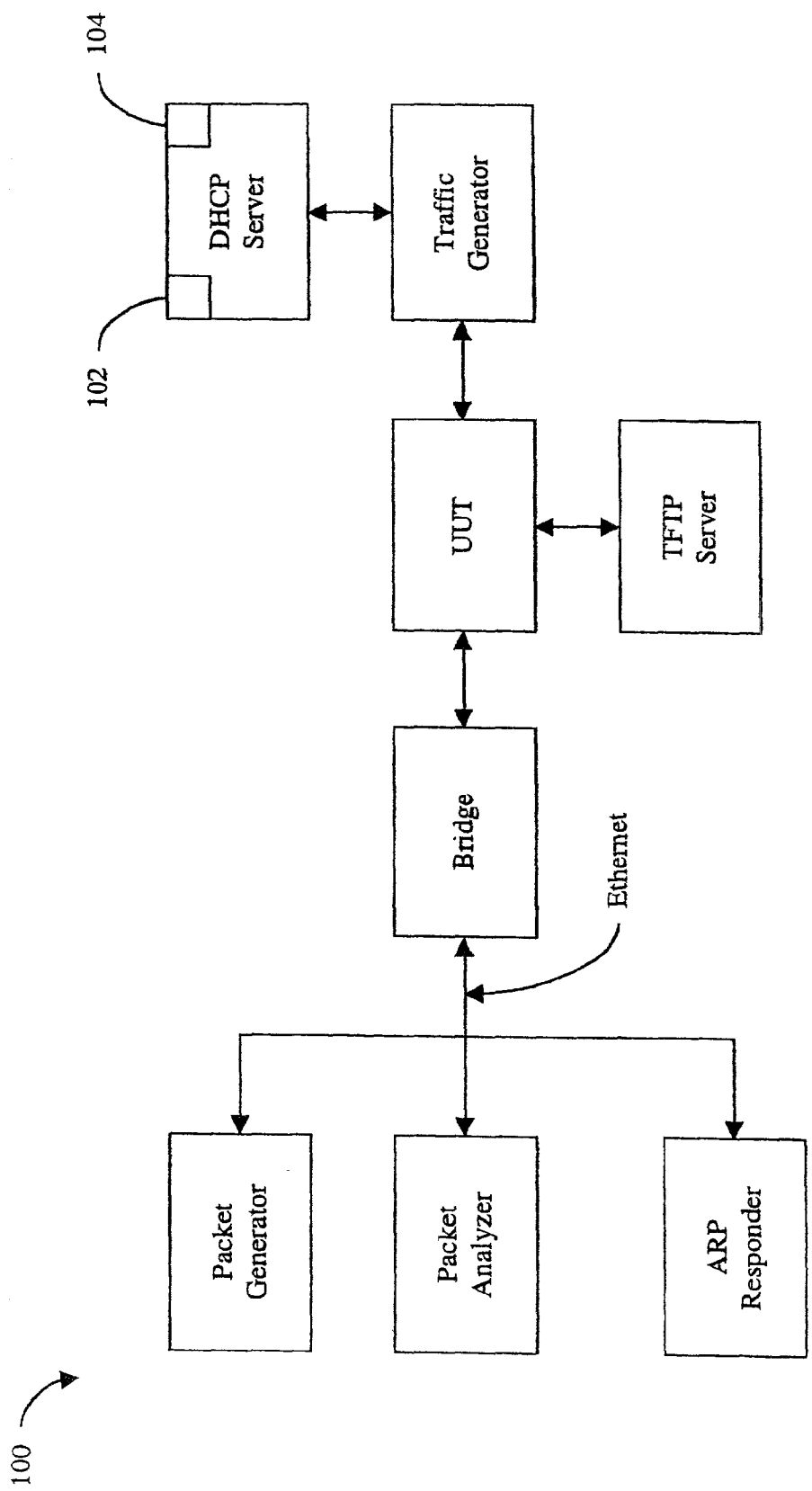
FIG. 1B is a conceptual block diagram of one aspect of a test system in accordance with the teachings of this disclosure.

FIG. 1B shows a block diagram of a network system 100 for which the performance is desired to be determined in accordance with the teachings of this disclosure. The system 100 is provided to illustrate an exemplary topology of but one system, other topologies will become apparent to those of ordinary skill in the art having the benefit of this disclosure. FIG. 1B presents one exemplary system illustrating possible WAN- and LAN-side elements, simulating a subscriber-to-network requests and responses process.

The system 100 may include a Unit Under Test (UUT). The UUT may comprise any packet routing device that may serve as a relay agent for the purposes of the present disclosure. For example, the UUT may comprise an edge router as is known in the art. The UUT may also comprise a hardware-based router, including a processor and associated memory for operating a switching fabric as is known in the art. Alternatively, the UUT may comprise a software-based router including a processor and associated memory for providing a memory-based switching fabric as is known in the art.

The LAN-side elements will be disclosed first, followed by the WAN-side elements.

The UUT may be coupled to a Trivial File Transfer Protocol (TFTP) server for storing static traffic routes created by the UUT. It is contemplated that any server known in the art suitable for operating in compliance with the TFTP protocol may be employed in the present disclosure.

The UUT may also be coupled to a packet generator for providing test packets to a scalability network under test. It is contemplated that a wide variety of standard routing equipment may be used for the packet generator of the present disclosure. For example, any packet generator which is capable of sending packets to may be employed, such as a Pagent packet generator available from Cisco Systems, Inc. This may also be achieved by any available in-house router-based packet generator.

Tool Command Language (TCL) scripts may be developed to control the router, enabling it to act as a traffic generator. Since the disclosed test procedure is router-based, any mid-range router may be converted for this usage by loading a special Pagent software image configured in accordance with this disclosure. Many suitable mid-range routers are available from Cisco Systems, Inc., and other manufacturers as well. Thus, the disclosed test presents a very cost-effective solution.

The UUT may also be coupled to a DHCP server for controlling the procedure of this disclosure. The DHCP server may include a processor 102 and memory 104. It is contemplated that the various procedures of this disclosure may be embodied as instructions stored in the memory 104 for retrieval and execution by the processor 102. It is contemplated that any server known in the art suitable for operating in compliance with the DHCP protocol may be employed in the present disclosure.

The UUT may also be coupled to an Address Resolution Protocol (ARP) server for providing MAC addresses to the UUT. It is contemplated that any server known in the art suitable for operating in compliance with the ARP protocol may be employed in the present disclosure.

It is contemplated that the UUT may be operatively coupled to the disclosed elements through Ethernet segments as is known in the art.

The UUT may be coupled to the WAN-side elements through a bridge as disclosed in FIG. 1A.

On the WAN-side, the system 100 of FIG. 1A may include a packet generator and a packet analyzer, each coupled to the UUT. The packet generator and analyzer may comprise separate units, or may be embodied as a single unit. The packet generator and analyzer may comprise Pageant-enabled servers as disclosed above.

The system 100 may further include a Address Resolution Protocol (ARP) server coupled to the UUT for providing MAC addresses to the UUT. It is contemplated that any server known in the art capable of operating in compliance with the ARP may be employed in the present disclosure.

Having described exemplary structure for a system in accordance with this disclosure, exemplary modes of operation will now be disclosed.

Figure 2:
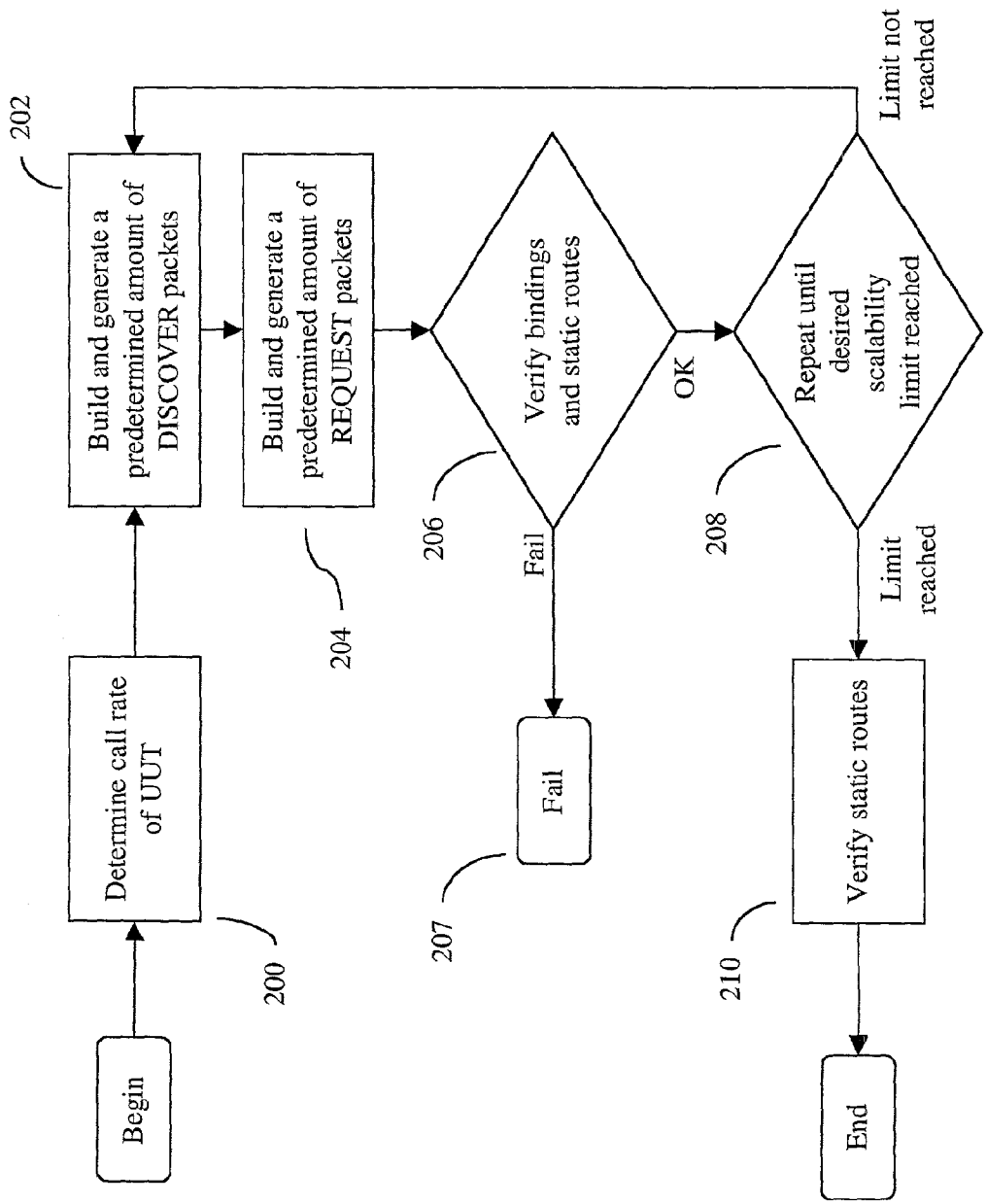
FIG. 2 is a flow diagram of one aspect of a test method in accordance with the teachings of this disclosure.

FIG. 2 is a flowchart of one aspect of a method for testing a UUT in accordance with the teachings of this disclosure. It is contemplated that this method, and others disclosed herein, may be performed by the structure disclosed above. For example, the present test procedure may be stored within the memory of the DHCP server as disclosed above.

The process of FIG. 2 may begin in act 200, where the call rate of the UUT is determined. As is appreciated by those of ordinary skill in the art, it is important to determine the call rate of the UUT as DHCP packets are handled by the UUT at the process level. The call rate of the UUT may be determined by any means known in the art. One exemplary method using the topology as disclosed above will now be disclosed.

The traffic generator may first be configured to generate DHCP DISCOVER packets. A predetermined number of packets may then be generated. The predetermined number may be an estimate of the capacity of the UUT. A packet analyzer, preferably set up in the same LAN, may be utilized to verify whether the same number of DHCP OFFER packets has been received from the DHCP server. If the received packets in the analyzer is less than the number of DHCP DISCOVER packets generated, the number of DHCP DISCOVER packets generated may be reduced until the DHCP OFFER packets is equal to the number of DHCP REQUEST packets generated. When the generated and received numbers are equal, the call handling capacity has been determined, and the process of FIG. 2 may proceed.

The process may then move to act 202, where a predetermined amount of DHCP DISCOVER packets having different source-MAC addresses are built and generated. The amount of packets built and generated is preferably less than or equal to the call handling capacity of the UUT as determined in act 200.

Simultaneously with act 202, the process also moves to act 204, where the packets are parsed in the packet analyzer. Based on the offered address, a corresponding number of DHCP REQUEST packets are then built and generated.

The process then moves to act 205, where both the pre-determined DISCOVER and DHCP REQUEST packets are being generated.

The process may then proceed to query 206, where the bindings and static routes are verified. The acts performed in query 206 are intended to be a quality control process to assure proper performance of the test system. It is contemplated that in query 206, the DHCP server may be examined to verify whether bindings have been properly created and stored therein. Additionally, the UUT may be examined to verify whether static routes corresponding to the addresses have been properly created. If either verification fails, the process may proceed to a alarm or fail condition in act 207. Appropriate troubleshooting measures may be employed to determine the cause of the failure, and the process may be restarted as desired.

If the verification is successful, the process may then proceed to query 208, where the process may be repeated a predetermined number of times until the scalability size of the test system is reached. It is contemplated that the number of test loops performed may correspond to a desired client test size. The number of loops or packets generated may also be an arbitrary number used to verify a UUT being examined under particular circumstances.

Once the scalability size has been reached, the process may proceed to act 210, where the static routes created during the process are verified. It is contemplated that the UUT may be examined to verify whether the static routes which should have been created during the process have in fact been stored in the TFTP server. If the verification in act 210 shows that all static routes have been properly created and stored, then it may be concluded that the UUT can function properly under the scalability conditions simulated during the test process as disclosed. If the static routes have not been properly created and stored, then the UUT may be further examined to determine why the UUT failed.

It is contemplated that further acts may be performed to enhance the completeness of the disclosed test procedure. For example, once the static routes have been properly created and stored, traffic may be generated and sent into the downstream LAN using a traffic generator. The ARP server will respond to the ARP requests made by the UUT. The effect of this downstream traffic may then be examined to further verify the operation of the UUT.

The test procedure is flexible enough to be used with a number of protocols. For example, the present test procedure may be performed compliant with Remote Bridging (RBE) for the proper encapsulation and forwarding of IP datagrams by using ARP. The present test procedure may also be performed in compliance with DHCP un-numbered for further verification of IP address leasing.

While embodiments and applications of this disclosure have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. A method of testing the scalability size of a Unit Under Test (UUT) bridging a WAN and a LAN, the method comprising: determining a call limit capacity for the UUT; building and generating a predetermined number of Dynamic Host Control Protocol (DHCP) DISCOVER packets; building and generating a corresponding number of DHCP REQUEST packets; verifying the proper creation of corresponding bindings and static routes; if said bindings and static routes have been successfully verified, then repeating said method until a desired scalability limit has been reached, and verifying the proper creation of bindings and static routes.

2. The method of claim 1, wherein said act of determining the call limit of the UUT comprises determining whether a predetermined number DHCP OFFER packets has been received from a DHCP server coupled to said UUT.

3. The method of claim 1, wherein said DHCP DISCOVER packets have different source-MAC addresses.

4. The method of claim 3, wherein the amount of packets built and generated is less than or equal to said determined call limit capacity.

5. The method of claim 1, further including the act of providing an error condition is said either of said verifications fails.

6. The method of claim 1, wherein said desired scalability limit corresponds to a client test size.

7. The method of claim 1, wherein said UUT comprises a router.

8. The method of claim 1, wherein said method is performed by a DHCP server.

9. The method of claim 1, further including the act of generating and sending traffic into a downstream LAN.

10. The method of claim 9, further including the act of examining said downstream traffic to further verify the operation of said UUT.

11. The method of claim 1, wherein said method is performed compliant with Remote Bridging (RBE).

12. A program storage device readable by a machine, tangibly embodying a program of instructions executable by the machine to perform a method of testing the scalability size of a Unit Under Test (UUT) bridging a WAN and a LAN, the method comprising: determining a call limit capacity for the UUT; building and generating a predetermined number of Dynamic Host Control Protocol (DHCP) DISCOVER packets; building and generating a corresponding number of DHCP REQUEST packets; verifying the proper creation of corresponding bindings and static routes; if said bindings and static routes have been successfully verified, then repeating said method until a desired scalability limit has been reached, and verifying the proper creation of bindings and static routes.

13. The device of claim 12, wherein said act of determining the call limit of the UUT comprises determining whether a predetermined number DHCP OFFER packets has been received from a DHCP server coupled to said UUT.

14. The device of claim 12, wherein said DHCP DISCOVER packets have different source-MAC addresses.

15. The device of claim 14, wherein the amount of packets built and generated is less than or equal to said determined call limit capacity.

16. The device of claim 12, further including the act of providing an error condition is said either of said verifications fails.

17. The device of claim 12, wherein said desired scalability limit corresponds to a client test size.

18. The device of claim 12, wherein said UUT comprises a router.

19. The device of claim 12, wherein said method is performed by a DHCP server.

20. The device of claim 12, further including the act of generating and sending traffic into a downstream LAN.

21. The device of claim 20, further including the act of examining said downstream traffic to further verify the operation of said UUT.

22. The device of claim 12, wherein said method is performed compliant with Remote Bridging (RBE).

23. An apparatus for testing the scalability size of a Unit Under Test (UUT) bridging a WAN and a LAN, the apparatus comprising: means for determining a the call limit capacity for the UUT; means for building and generating a predetermined number of Dynamic Host Control Protocol (DHCP) DISCOVER packets; means for building and generating a corresponding number of DHCP REQIJEST packets; means for verifying the proper creation of corresponding bindings and static routes, means for repeating said method until a desired scalability limit has been reached if said bindings and static routes have been successfully verified, and means for verifying the proper creation of bindings and static routes.

24. The apparatus of claim 23, further including means for determining whether a predetermined number DHCP OFFER packets has been received from a DHCP server coupled to said UUT.

25. The apparatus of claim 23, wherein said DHCP DISCOVER packets have different source-MAC addresses.

26. The apparatus of claim 25, wherein the amount of packets built and generated is less than or equal to said determined call limit capacity.

27. The apparatus of claim 23, further including means for providing an error condition is said either of said verifications fails.

28. The apparatus of claim 23, wherein said desired scalability limit corresponds to a client test size.

29. The apparatus of claim 23, wherein said UUT comprises a router.

30. The apparatus of claim 23, wherein either of said means for verifying comprises a DHCP server.

31. The apparatus of claim 23, further including means for generating and sending traffic into a downstream LAN.

32. The apparatus of claim 31, further including means for examining said downstream traffic to further verify the operation of said UUT.

33. The apparatus of claim 23, wherein said method is performed compliant with Remote Bridging (RBE).

* * * * *